United States Patent
Suehiro et al.

(10) Patent No.: US 6,460,176 B1
(45) Date of Patent: Oct. 1, 2002

(54) METHOD OF, APPARATUS FOR, AND RECORDING MEDIUM STORING A PROGRAM FOR, PARALLELIZING A PROGRAM CONTAINING AN ARRAY DESIGNATED TO UNDERGO INDIRECT AND IRREGULAR DIVISION

(75) Inventors: Kenji Suehiro, Tokyo (JP); Hitoshi Murai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/275,968

(22) Filed: Mar. 25, 1999

(30) Foreign Application Priority Data

Mar. 31, 1998 (JP) .......................................... 10-103969

(51) Int. Cl.⁷ ................................................. G06F 9/44
(52) U.S. Cl. ........................ 717/119; 709/201; 712/28
(58) Field of Search ................................. 717/6, 9, 149, 717/151–161, 106, 114, 119; 709/104, 200, 201, 205, 213, 214, 215, 400; 708/232, 524; 712/22, 28

(56) References Cited

U.S. PATENT DOCUMENTS

| | | | |
|---|---|---|---|
| 4,939,642 A | * 7/1990 | Blank | 712/22 |
| 6,077,315 A | * 6/2000 | Greenbaum et al. | 717/157 |
| 6,154,765 A | * 11/2000 | Hart | 709/201 |

FOREIGN PATENT DOCUMENTS

| | | | |
|---|---|---|---|
| JP | 5-274277 | 10/1993 | |
| JP | 8-227405 | 9/1996 | |
| JP | 09259094 | * 10/1997 | ........... G06F/15/16 |

OTHER PUBLICATIONS

Fortran D Language Specification—Authors: Geoffrey Fox, Seema Hiranandani, Ken Kennedy, Charles Koelbel, Ulrich Kremer, Chau–Wen Tseng and Min–You Wu, (CRPC–TR 90079, Dec. 1990). Center for Research on Parallel Computation, pp. 1–37.

* cited by examiner

*Primary Examiner*—Gregory Morse
*Assistant Examiner*—Hoang-Vu Antony Nguyen-Ba
(74) *Attorney, Agent, or Firm*—Sughrue Mion, PLLC (57) ABSTRACT

A method of, apparatus for and computer-readable medium for obtaining a program for a distributed memory-type parallel computer by dividing data for a program written for a serial processing computer. The method comprises changing a declaration of an array to be subjected to indirect or irregular division which is designated by the mapping array in the program into a declaration of an allocation array; inserting statements to declare the allocation array for converting subscripts and to calculate the size of the divided array during processing, and inserting a statement to preserve or to release an area for divided arrays corresponding to the calculated length of arrays to be divided and subscript conversion arrays during processing.

8 Claims, 7 Drawing Sheets

```
1:   subroutine sub(b,dist)

2:   dimension, real :: a(10)
3:   dimension, real :: b(10)
4:   dimension, integer :: dist(10)

5:   distribute (indirect(dist)) :: a

6:   do i = 1, 10
7:       a(i) = b(i)
8:   end do

9:   end
```

```
1:    subroutine sub(b, dist)

2:    dimension, allocatable, real :: a(:)
3:    dimension, real :: b(10)
4:    dimension, integer :: dist(10)
5:    dimension, allocatable, integer :: ltog(:)

6:    n = CountElems(dist)
7:    allocate (a(n), ltog(n))
8:    ltog = LocalToGlobal(dist)

9:    do i = 1, n
10:       a(i) = b(ltog(i))
11:   end do

12:   deallocate (a, ltog)

13:   end
```

METHOD OF, APPARATUS FOR, AND RECORDING MEDIUM STORING A PROGRAM FOR, PARALLELIZING A PROGRAM CONTAINING AN ARRAY DESIGNATED TO UNDERGO INDIRECT AND IRREGULAR DIVISION

BACKGROUND OF THE INVENTION

1. Field of the Invention

This invention relates to a method of parallelizing a program, an apparatus for parallelization, and a recording medium storing the parallelization program, and particularly relates to a technology for converting a program prepared for serial processing computers or shared memory-type parallel computers into a program for distributed memory-type parallel computers.

2. Background Art

There is a case wherein it is desired to execute calculations by allocating individual elements of arrayed data to an optional processor of a distributed memory-type computer.

For example, in an application program of a simulation for clarifying a physical phenomenon by calculating interactions of particles freely moving in a space, the calculation is executed, while preserving data corresponding to individual particles as an array, by allocating these particle data in the array to a suitable processor according to its position in the simulation space. Japanese Patent Application, First Publication No. Hei 5-274277 shows an example of an apparatus which realizes such a simulation while reducing the communication cost between processors by allocating the same number of the particles distributed in a simulation space to each processor and by making the positional relationship of those processors equivalent to the positional relationship of the particles in the simulation space.

The conventional technique is constructed, as shown in Japanese Patent Application, First Publication No. 8-227405, on the premise that a user forms a program for the distributed memory-type parallel computer. Thus, when it is desired to carry out the allocation of such irregularly distributed particles by a processing program, it was necessary for a user to describe the complicated procedures on the program to rearrange the particle data of particles to be allocated to the same processor such that the array of the particles is arranged in ranges of successive subscripts and to subsequently divide the array into each range. The process of rearranging the particle data is originally not required, in the case when the simulation program is described for the serial processing computer or the shared memory-type parallel computer, so that such processing is unrelated to the essential subject given to the computer to solve. To require a user of the distributed memory-type parallel computer to describe such complicated program not only degrades the consistency of the program, but also raises the cost for developing the program and at the same time reduces the convenience of the distributed memory-type parallel computer.

In order to perform allocation of such an irregularly distributed array effectively, it is clear and preferable if the user can designate division of the array in the program by using a particular array called a "mapping array" which maintains the corresponding relationship between individual array elements and the processor to which these elements will be allocated. This method is proposed, for example, in a document by G. Fox, et al., entitled "Fortran D Language Specification, CRPC-TR90079", Department of Computer Science, Rice University, April 1991. The designation of divided arrays to each processor by such a mapping array is called "indirect division".

However, a method to convert a program including an array designated to be divided by indirect division into a program to be effectively executed in parallel is not known. That is, an example of technique to convert the program prepared for the serial processing computer into a program for the distributed memory-type parallel computer is disclosed in Japanese patent Application, First Publication No. Hei 6-139212. This technique is based on the premise to perform regular divisions, such as row division, line division, and a combination of row and line division. Therefore, the above document does not disclose a method of irregular division, or in other words, a method of dividing data that is irregular. That is, the above document does not disclose a method of converting a program containing an array designated to undergo indirect division by the mapping array into a program to be executed in parallel.

It is therefore the object of the present invention to provide a method of converting a program containing an array designated to undergo indirect division into a program effectively executable in parallel processing, so that the user can substantially designate indirect division of the array and to improve the convenience of the distributed memory-type parallel computer.

SUMMARY OF THE INVENTION

A method for parallelizing a program according to the present invention comprising the steps of: changing a declaration of an array to be subjected to indirect division; inserting a declaration of the subscript conversion array; inserting a statement to calculate the size of the array after indirect division; inserting a statement to preserve or to release an area for the array to be divided by indirect division and the subscript conversion array; inserting a content of the subscript conversion array; changing a control range of a loop; and changing the control variable reference.

In more detail, the present method comprises;

the first step for inputting a program to be parallelized;

the second step for changing a declaration of an array, which division is designated by the mapping array in the input program and which is to be divided by indirect division, into a declaration of the allocation array;

the third step for inserting a statement of the allocation array for each mapping array in the input program;

the fourth step for inserting a statement for calculating the size of an array after being divided by indirect division for each mapping array in the input program;

the fifth step for inserting a statement to preserve during processing an area for the array to be divided by indirect division according to the result of calculation during processing obtained in the fourth step, and said subscript conversion division, and a statement to release said area;

the sixth step for inserting a statement to dynamically calculate the content of said subscript during processing based on the content of the mapping array;

the seventh step for changing the control range of all parallelizable loops containing a reference of the array to be divided by indirect division;

the eighth step for changing references of the control variables of arrays beside the indirectly divided array among loop arrays to the reference of the subscript conversion array, conforming with the change of control variables in the seventh step; and the ninth step for outputting a program obtained by processing from the second step to the eighth step as the parallelized program.

A program parallelization apparatus of the present invention comprises, a means to change the declaration of the array to be divided by indirect division; a means to insert the declaration of the subscript conversion array; a means to insert a statement of a size of the array after division of the array to be divided by indirect division; a means to insert a statement to preserve and release the area for the array to be divided by indirect division and the subscript conversion array; a means to insert a statement to calculate the content of the subscript conversion array; a means to control the range of the loop; and a means to change the control variable reference in the loop.

In more detail, the program parallelization apparatus comprises:

the first means for inputting the program to be parallelized;

the second means for changing a declaration of an array, which is to be subjected to indirect division, and which is designated to be divided by the use of the mapping array in the input program;

the third means for inserting the declaration of the allocated subscript conversion array for each mapping array in the input program;

the fourth means for inserting a declaration to calculate during processing the size of the array after indirect division for each mapping array in the input program;

the fifth means for inserting statements to preserve and to release the area for the array to be subjected to indirect division and said subscript conversion array, in response to the size of the array obtained during processing by the statement inserted by the fourth step;

the sixth means for inserting a statement to dynamically calculate the content of said subscript conversion array based on the content of the mapping array;

the seventh means for changing the control ranges of every loop which is parallelizable and which includes references of arrays to be subjected to indirect division in the input program;

the eighth means for changing the reference of the control variables of arrays, except those subjected to indirect division, to the reference of said subscript conversion array, together with the change of the control range of the loop by said seventh means; and the ninth means for outputting the parallelized program obtained by processing according to said second to eighth steps.

The action of the apparatus for parallelizing a program can be summarized as follows. The present apparatus becomes capable of distributing the array to undergo indirect division grouped to local memories belonging to each processor of a distributed memory-type parallel computer by means of the second means for changing the declaration of the array to be divided by indirect division, a fourth means for inserting a statement to calculate the size of the array after indirect division, and the fifth means for inserting a statement to preserve and to release the area to store the array for indirect division and the subscript conversion array. The present apparatus becomes subsequently capable of matching the subscripts for the array after indirect division and for the other arrays by means of the third means for inserting the declaration of the subscript conversion array, the fifth means for inserting the statement to preserve and release the area for the subscript conversion array, and the sixth means for inserting an statement to calculate the content of the subscript conversion array. In addition, it becomes possible to convert the input program into a program for executing the loops in parallel by means of the seventh means for changing the control range of the loop and the eighth means to change the control variables in the loops.

DETAILED DESCRIPTION OF THE PREFERRED EMBODIMENTS

The preferred embodiments of the present invention will be described hereinafter.

Figure 1:
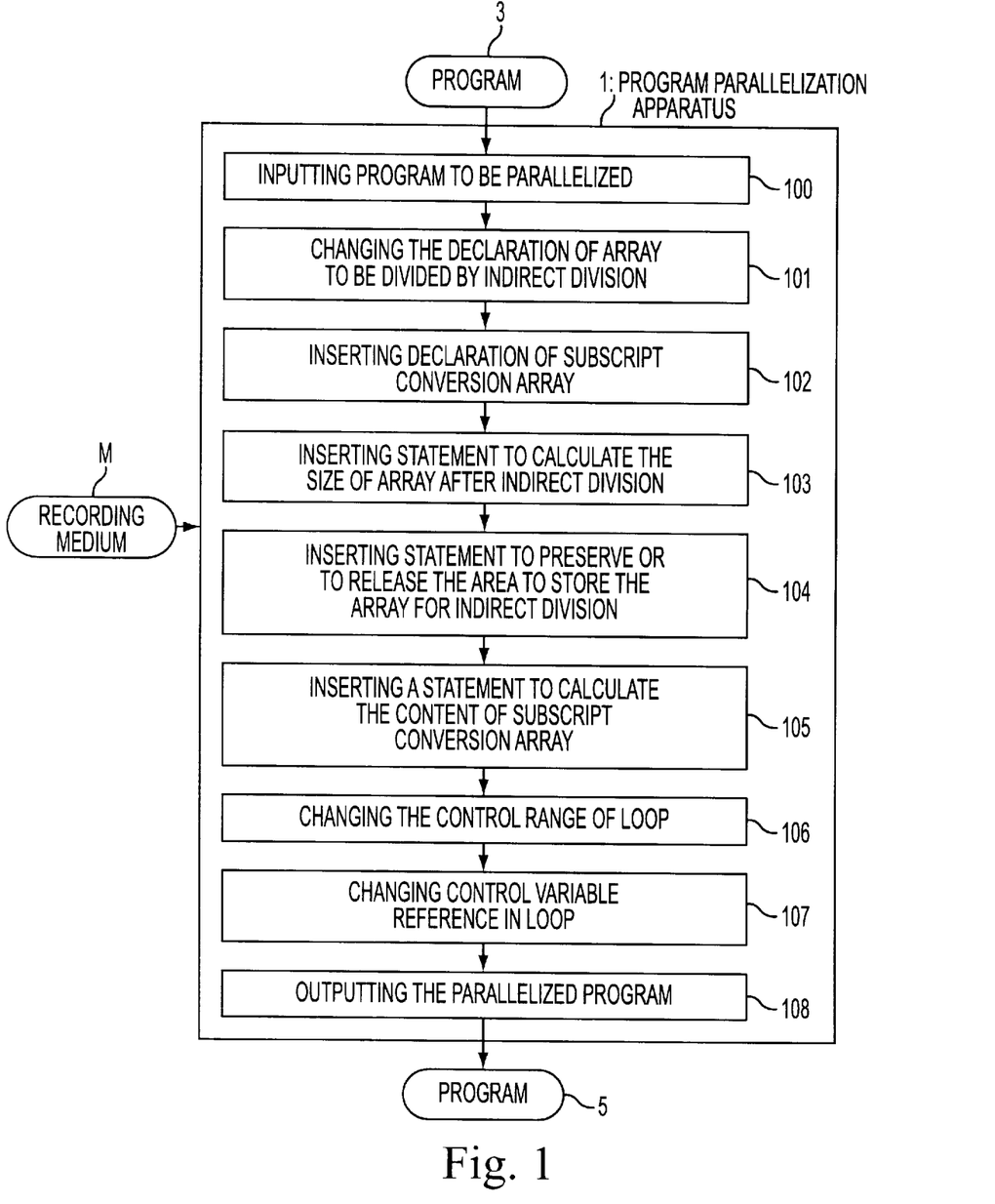
FIG. 1 is a block-diagram showing an embodiment of the present invention.

FIG. 1 is a block diagram showing a structural example of an embodiment of the present invention. The program parallelization apparatus according to an embodiment of the present invention is an apparatus for outputting a converted program (source program) 5 for the distributed memory-type parallel computer y processing the input program (source program) 3 prepared for the serial processing computer or the common memory-type parallel computer by processing the input program (source program) 3 prepared for the serial processing computer or the common memory-type parallel computer. Steps 100 to 108 depicted in the program parallelization apparatus 1 show the processing procedures, and these procedures are realized by the parallelization program recorded in the recording medium M. This recording medium M may be machine-readable media such as a CD-ROM, a semiconductor memory, or a magnetic disc. The parallelization program recorded in the machine-readable medium is read by the computer which comprises the program parallelization apparatus 1, and by controlling the operation of the computer, the processing steps 100 to 108 are executed.

Referring to FIG. 1, the program parallelization apparatus according to this embodiment of the present invention converts the program 3 designed for the serial processing computers or the shared memory-type parallel computer into the program 5 for the distributed memory-type parallel computer 5 by executing the following steps: step 100 for inputting the program 3 to be parallelized; step 101 for changing a declaration of the array to be indirectly divided; step 102 for inserting a declaration of an array for the subscript conversion; step 103 for inserting a statement for calculating a size of the array after indirect division; step 104 for inserting a statement to secure and release of area for the array after indirect division and the array for the subscript conversion; step 105 for inserting a statement to calculate the content of the array for subscript conversion; step 106 for changing a range of the loop control; step 107 for changing the control reference variable in the loop; step 108 for outputting the parallelized program 5.

These steps from 101 to 107 are not necessary to be executed in this order, and the order of step s may be switched in a random manner.

The step 101 for changing the declaration of the array to undergo indirect division changes the declaration statement in the program of the array designated to be divided using the mapping array. Since the array is divided and allocated to a plurality of processors, the divided arrays for respective processors will have a different size from that of the original array, and the size of the array cannot be decided until the execution of the program, so the declaration statement must be changed as stated above. Explanations of respective steps are described hereinafter.

The step 102 for inserting the declaration of the subscript conversion array inserts the declaration statement of the array for converting the subscripts required for executing the parallel processing. In this embodiment, allocation is carried out such that only the necessary elements are grouped at the time when the array to be subjected to indirect division is allocated to respective processors. Thus, the subscripts of the array elements on respective processors differ from the subscripts of the array elements before division. The subscript conversion array is the array that maintains such corresponding relationship.

The step 103 for calculating the size of the divided array after indirect division inserts a code to calculate the size of the array allocated to respective processors into the program.

The step 104 for inserting the statement to maintain and release the area of the array to undergo indirect division and the array for converting the subscripts inserts the code for practically allocating the necessary memory area in the program.

The step 105 for inserting the statement to calculate the content of the subscript conversion array inserts a code to calculate a value to be set for the subscript conversion array.

The step 106 for changing the control range of the loop changes the control range of the loop such that only the loop ranges allocated to respective processors by parallelization are actually executed. In this embodiment, it is decided which processor executes which cycle of the loop, including the reference of the array to be divided indirectly. Accordingly, control variables of the loop are changed to conform within the range of the subscript of the divided array.

The step 107 to change the control variable reference in the loop rewrites the program in the loop so as to realize rereading of the control variables by the subscript conversion array, wherein rereading is required after the control range of the loop at the step 106.

The step 108 for outputting the parallelized program outputs the parallelized program produced by the processing from 101 to 107 to a file and so on. On the other hand, when the parallelized program is to be compiled, the program is input into a compiler (not shown), and the object program is also generated.

As described above, since the present embodiment allocates the array elements to be divided indirectly in the group, the utilization efficiency of the local memories in each processor can be sufficiently high. In addition, the control variables of the loop are made to conform with the subscripts of the divided array, so that the divided array can be referred to with the same efficiency as that for not-parallelized array and reference of the undivided array can be carried out at high speed by utilization of the subscript conversion array.

Hereinafter, an operation of this embodiment will be explained in more detail by the use of practical examples.

Figure 2:
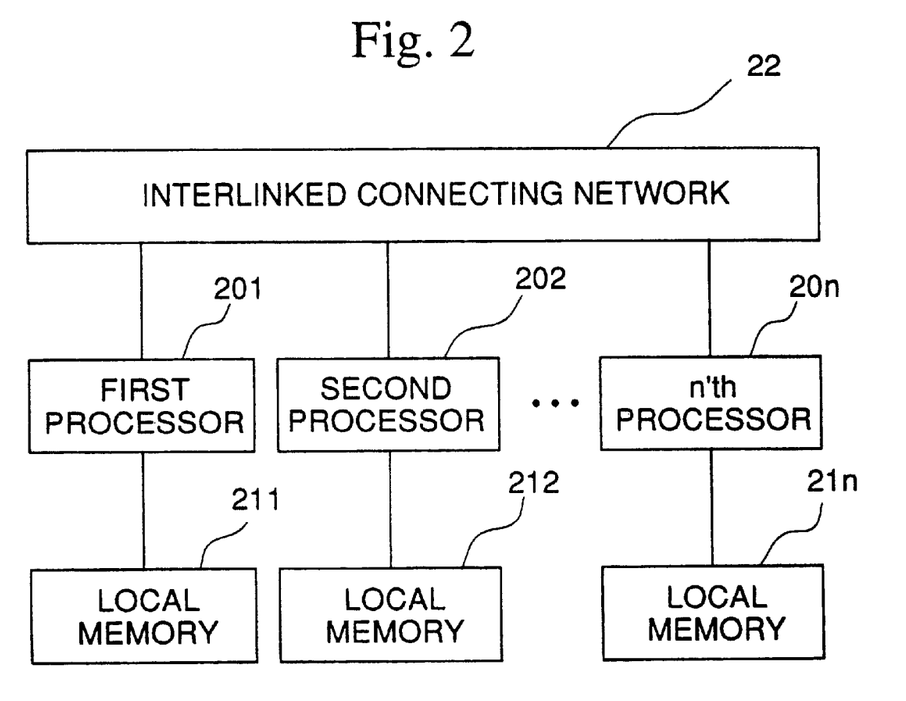
FIG. 2 is a block-diagram showing an structural example of the parallel computer which executes the parallel program according to the present invention.

FIG. 2 is a block-diagram showing a constructive example of a distributed memory-type parallel computer for executing a parallelized program produced by a parallelizing method of the present invention. This parallel computer comprises a plurality of processors 201 to 20n, local memories belongings to respective processors, and an interlinked connecting network 22. It is possible to refer directly to the data located on local memories 211 to 21n through the processor to which the local memory belongs. However, it is not possible to refer directly the data from the other processor, and the reference is made by transferring data through the interlinked connecting network 22.

Figure 3:
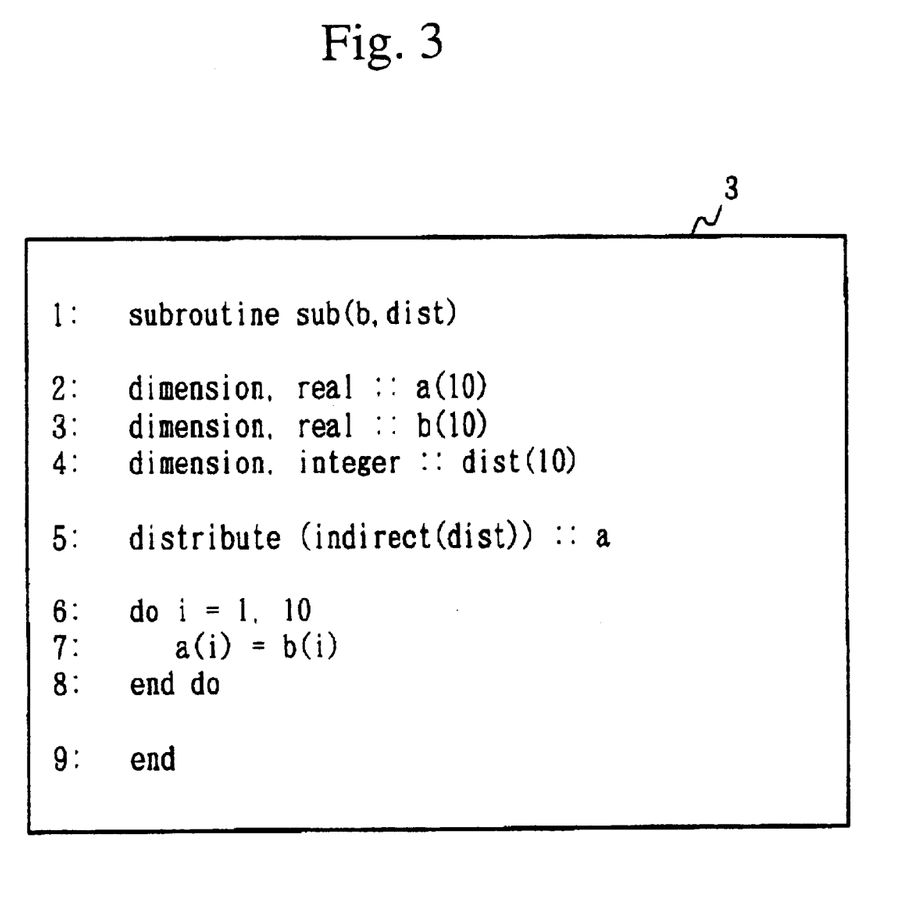
FIG. 3 is a diagram showing an example of the program to be parallelized by the present invention.

FIG. 3 is a diagram to explain an example of the program 3 which is parallelized by the method of program parallelization by the present invention. This example of program 3 is a modified version of the source program described for the serial processing computer or the shared memory-type parallel computer, and generally follows the grammar of the FORTRAN language, but a part of the grammar of this program is extended for describing the method of dividing data to respective processors. The symbol mark placed at the left end of each line is a line number to aid in understanding. The first line is a statement to start this sub-routine. In the second to fourth lines, the type and size of arrays a, b, and dist are declared. Here, the array dist is the mapping array. The fifth line declares a method of dividing the array a into respective processors by the extended grammar. In other words, the fifth line declares that the array a is subjected to indirect division, which is to say that the fifth line declares that the number of a processor to which the array elements a(i) is to be allocated is stored in an array element dist (i). For example, when 2 is stored in the dist (3), the a (3) is allocated to the No. 2 processor. Assume that, since the arrays b and dist are not declared, all of these elements are copied on all processors. The sixth to eighth lines form the loop and operate to make a copy of the content of array b on array a. In the loop, the element referred as to the array a to be subjected to indirect division is only the element a which is indexed directly by the loop function i. The ninth line indicates a statement showing the completion of the sub-routine.

Figure 4:
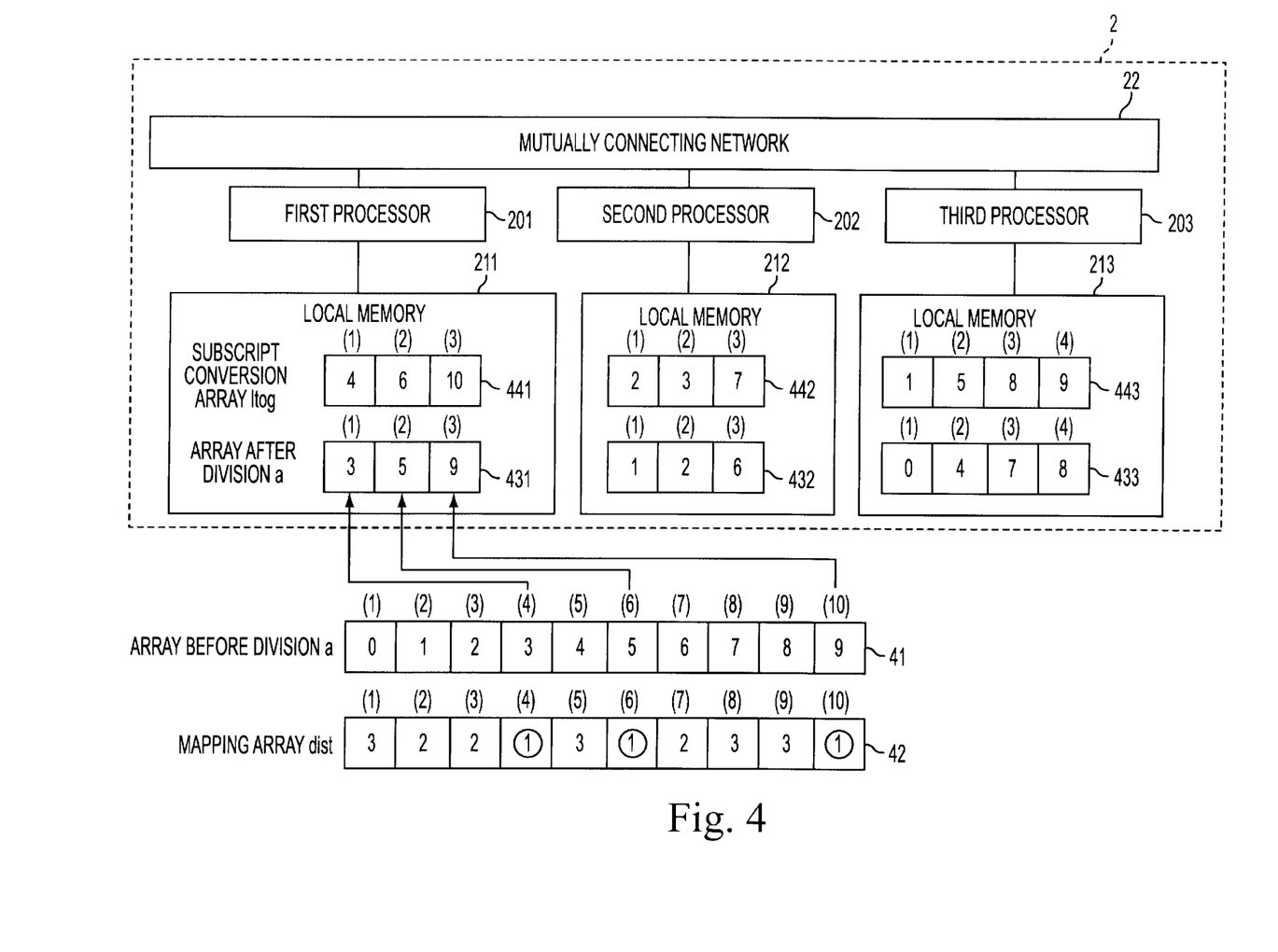
FIG. 4 is a block diagram showing the operations of one program to be parallelized by the present invention on a parallel computer.

FIG. 4 is a schematic diagram to explain the concept of how to implement the parallelized execution of the program shown in FIG. 3 on a parallel computer shown in FIG. 2. In this case, three processors are used for ease of explanation. Assume that the content of the mapping array 42 (array dist) is as shown in FIG. 4, in contrast to the array 41 (array a). At this time, the array 431 grouped after indirect division is allocated to the local memory 211 belonging to the No. 1 processor. That is, among elements in the array 41 (array a), the fourth, the sixth and the tenth elements having values of the mapping elements equal to 1, are collected and grouped and allocated to the No. 1 processor. In order to indicate which element of the array 431 after indirect division corresponds to which element of the array 41 before indirect division, the array for subscript conversion 441 (the array Itog, hereinafter described) is used. Similarly, the collected and packed elements having values in the mapping array 42 of 2 and 3 and the arrays 432 and 433 after indirect division and the arrays 442 and 443 for subscript conversion are also allocated to the local memory 212 belonging to the No.2 processor 202 and the local memory 213 belonging to No. 3 processor 203, respectively.

The parallelized program is obtained by the loop processing at the repeating number which is allocated corresponding to the number of elements of the array 431 to 433 stored in respective processors 201 and 203. For example, the repeating processings are conducted for i=1 to 3 in the case of the No. 1 processor. At this time, the repeating processing regarding i=1, i=2 and i=3 corresponds to the repetitive processing i=4 of the original loop, the repetitive processing i=6 of the original loop, and the repetitive processing i=10 of the original loop. This correspondence is made with reference to the array 441 for subscript conversion. Similarly, the repeating processing of the loop is carried out for processors No. 2 and No. 3 depending of the number of times corresponding to the number of elements of the arrays after the conversions 432 and 433.

Figure 5:
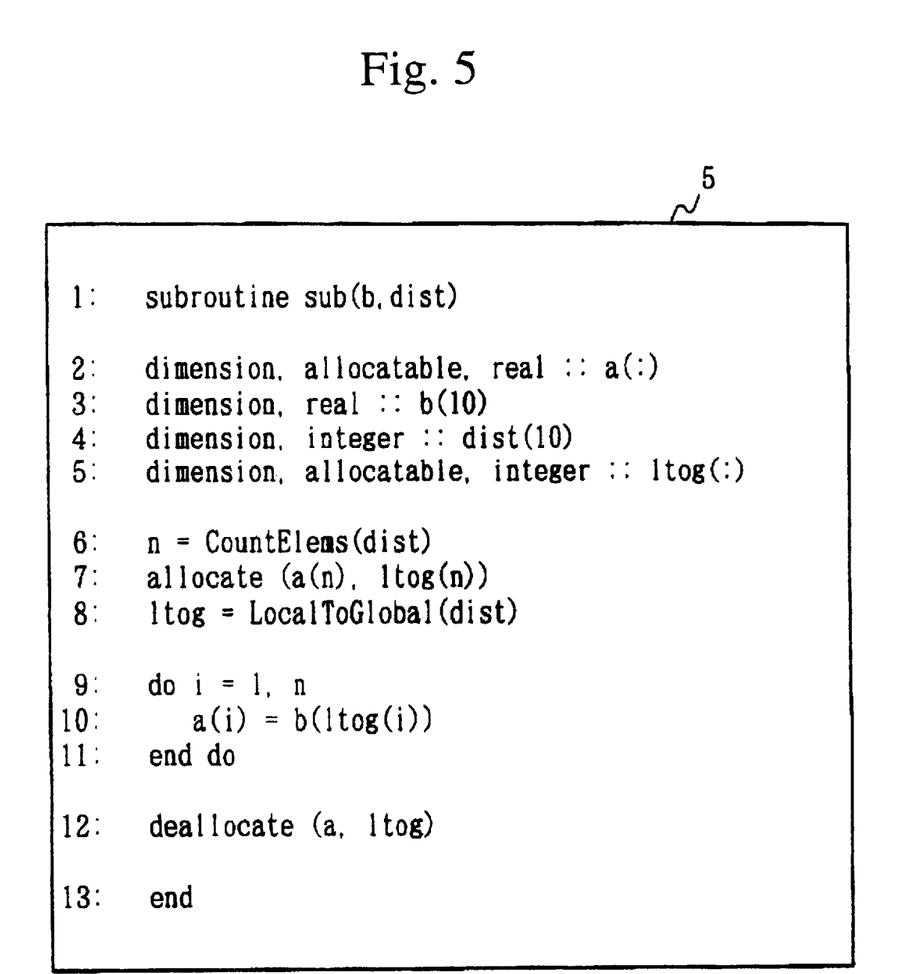
FIG. 5 shows an example of the parallelized program.

FIG. 5 is a diagram to explain the program 5 after the parallelization of the program 3 by the method of parallelization shown in FIG. 1. Hereinafter, the parallelizing process according to the method shown in FIG. 1 will be described.

First, the array a is declared again as the allocation array. This is because it is necessary to preserve the memory area for the array a during processing, since the number of elements of the array a on respective processors can not be decided until execution of processing. This processing is carried out in step 101 in FIG. 1. In step 101, such changes are declared for all of the arrays in the program to be subjected indirect division. Thereby, the second line in FIG. 3 is rewritten as the second line of FIG. 5.

Next, declaration of the array Itog for the subscript conversion is inserted. This processing is carried out in the step 102 in FIG. 1. The step 102 adds a declaration of the subscript conversion array in each mapping array for indirect division at the end of declaration portions in the program. Thus, the fifth line of FIG. 5 is added. Since the array Itog for the subscript conversion is an integer-type array, and since it is necessary for its size to be identical with the subject array (the array undergoing indirect division) after the division., the array Itog is declared as an allocation array.

Although the statement to preserve the area for the arrays a and Itog are inserted, it is necessary to know how many elements are arranged on respective processors, preceding to the insertion. Since the number is only decided during processing of the program, the code for calculating the number of elements to be arranged on the own processor is inserted into the program. This processing is carried out in the step 103 in FIG. 1. The step 103 inserts the statement at the top of the processing portion of each mapping array. Thereby, the sixth line in FIG. 5 is inserted. Here, a returned value is substituted in the integer-type variable n, providing that the actual calculation is carried out using the library function of Count Elems at time of processing. However, it is not always necessary to take the form of a calling function. The detail of the content of the function of Count Elems will be mentioned later.

Subsequently, a statement to secure the area for the array a and Itog is inserted. In addition, a statement to release the area after these arrays are completely used is also inserted. These insertions are carried out by the step 104 in FIG. 1. The step 104 inserts the statement to secure the area just after the statement inserted by the step 103 and inserts the statement to release the area immediately before the completion of the sub-program. Thereby, the seventh line and the twelfth line in FIG. 5 are inserted. The area is secured by the seventh line, and the area is released by the twelfth line.

The step 105 in FIG. 5 is the step to insert a statement for dynamically calculating the content of the subscript conversion array in each processor during processing. The step 105 inserts the statement for calculating the contents of the subscript conversion array just after the statement for securing the area inserted in the step 104. Thereby, the eighth line in FIG. 5 is inserted. Although the returned value array is substituted in the subscript conversion array Itog, providing that the actual calculation is carried out using a function of Local ToGlobal, it is not always necessary to take a form of a calling the function. The detail of the function of Local ToGlobal will be described later.

Finally, rewriting of the control variable in the loop is carried out. After parallelization, the control variables of the loop become local indices for respective processors. In order to make the variables after parallelization correspond to the control variables before the parallelization, it is necessary for the reference of the control variables i to reform into the reference of the subscript conversion array Itog(i). However, when the reference appears on the subscripts of the array a after indirect division, the rewriting is not necessary. This processing is carried out in step 107 in FIG. 1. In the step 107, the seventh line in FIG. 3 is reformed as the tenth line in FIG. 5.

Figure 6:
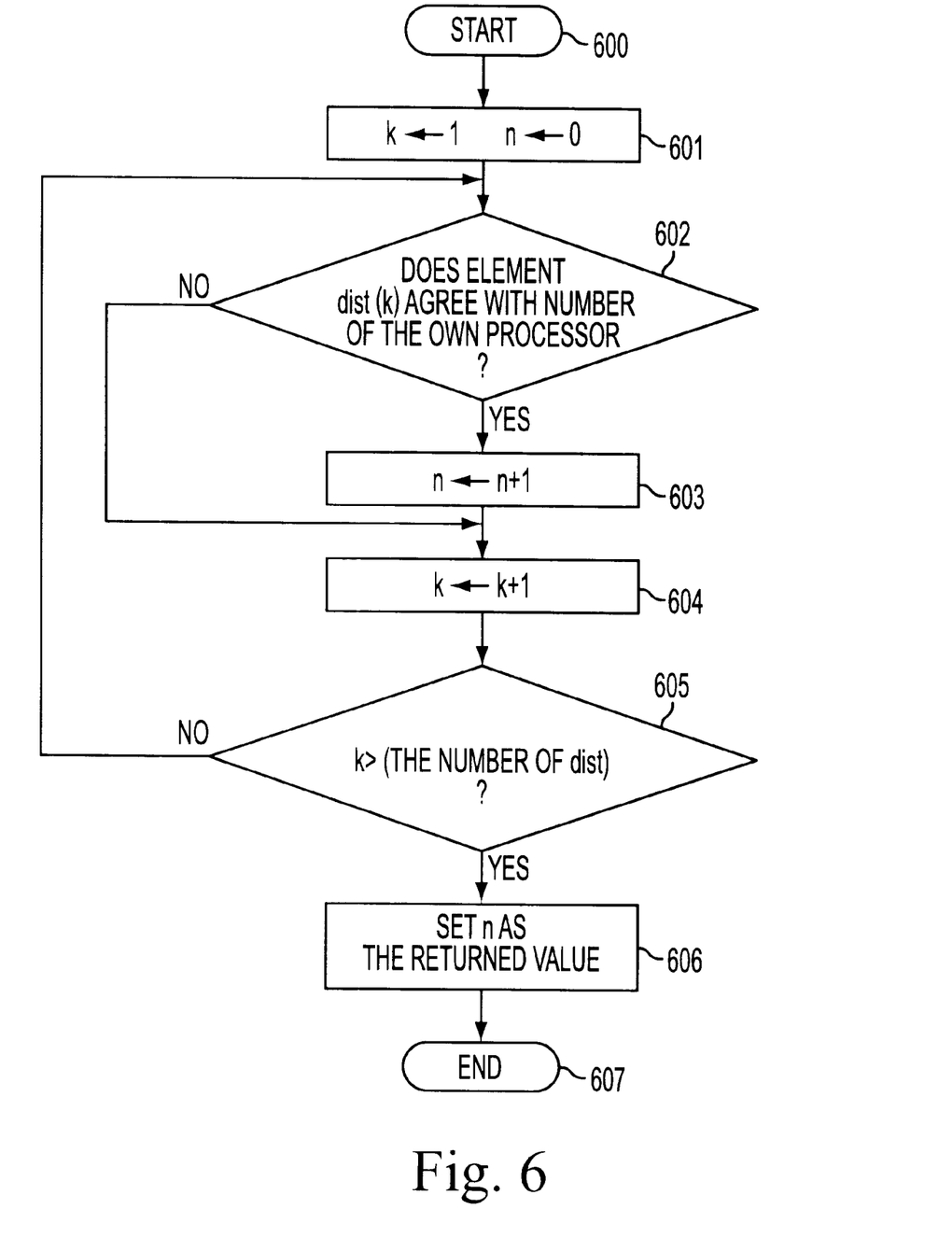
FIG. 6 is a first flow-chart showing an operation when executing the routine read from the parallel programs according to the present invention.

FIG. 6 is a diagram to explain what is done in the above described function of Count Elems. In the step 601, the counter k is initialized into 1, and n is initialized to 0. The step 602, referring to the mapping array dist, inspects whether or not the element of the mapping array dist (k) agrees with the number of its own processor. If k exceeds the number of elements, since inspection of every elements has completed, the value preserved in the counter n is incremented by one in the step 603. In the step 604, the counter k is incremented by one, and in the step 605, is checked to ascertain whether it exceeds the number of elements in dist. If k exceeds the number of elements, since inspection of every elements has completed, the value preserved in the counter n represents the number of elements which agrees with the number of their own processor, that is, the number of elements of the array, which is to be divided indirectly by the mapping array, and which is allocated to their own processor.

Figure 7:
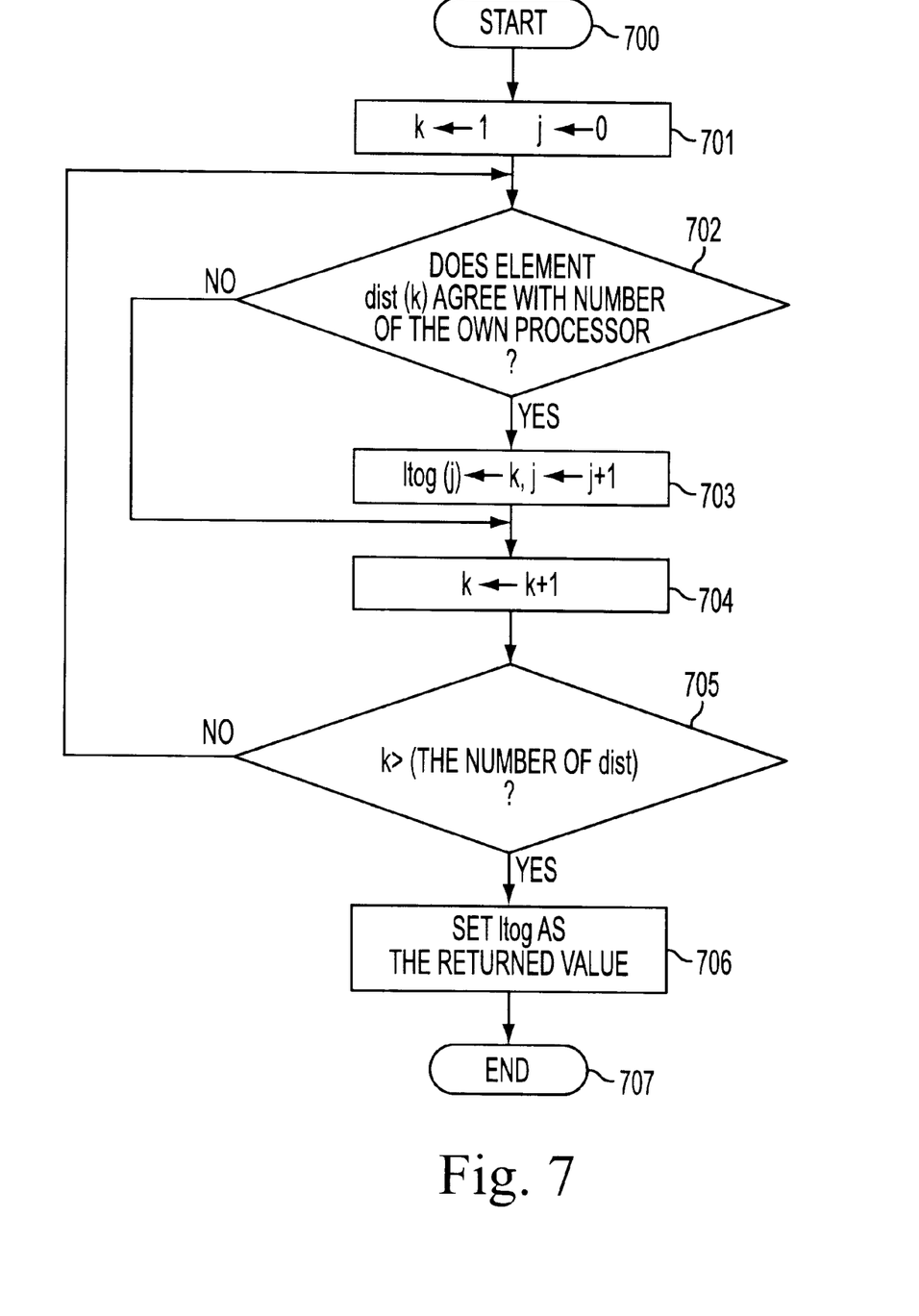
FIG. 7 is a second flow-chart showing operations when executing the routine read from the parellelized program according to the present invention.

FIG. 7 is a diagram to explain the above mentioned function of Local Global. In the step 701, the counters k and are initialized to 1, respectively. The step 702, referring to the mapping array, inspects whether or not the value of an element dist (k) agrees with the number of its own processor. When the value agrees with the number of the processor, the value of the counter j is incremented by 1. In the step 704, the value of the counter k is incremented by 1, and at the step 705 the value k is checked to ascertain whether it exceeds the number of elements of dist. If k exceeds it, since inspections for all elements has been completed, the values preserved in the array Itog form an array for a subscript conversion array (step 706).

As hereinabove described, the present invention exhibits following advantageous effects.

The first advantageous effect is that the present invention is capable of obtaining a program for distributed memory-type parallel computers by just adding an additional description concerning a method of dividing data to a program designed for the serial processing computers or for the shared memory-type parallel computers, even if the method of dividing data is not regular.

The second advantageous effect is that the present invention increases the utilization efficiency of the local memories to respective processors, because the elements of the array to be divided indirectly are allocated after being grouped.

The third advantageous effect of the present invention is that the divided array can be referred by the same efficiency as for the array before the parallelization, since the control variables of the loop are made to conform with the subscripts of the divided arrays. In addition, the reference to the undivided array can be performed at a high speed by utilization of the subscript conversion array.

What is claimed is:

1. A parallelized program generating method, comprising:
changing a declaration of a subject array to be subjected to an indirect division;
inserting a declaration of a subscript conversion array;
inserting a statement for calculating the size of said subject array after indirect division;
inserting a statement to allocate an area for said subject array and a subscript conversion array;
inserting a statement for calculating the content of said subscript conversion array;
changing a control range of a loop; and
changing an array index that makes use of a control variable in said loop.

2. A method of parallelization of a program comprising:
a first step for inputting a program to be parallelized;
a second step for changing a declaration of a subject array in the input program, which subject array is to be indirectly divided by use of a mapping array, into an allocation array declaration;
a third step for inserting a declaration of an allocation array for subscript conversion to each mapping array in the input program;
a fourth step for inserting a statement to calculate during processing the size of said subject array after division, before indirect division by a mapping array;
a fifth step for inserting a statement to allocate an area for said subject array, and the subscript conversion array;
a sixth step for inserting a statement for dynamically calculating during processing the content of said subscript conversion array;
a seventh step for changing control ranges of all loops which are parallelizable and contain a reference of said subject array;
an eighth step for changing an array index in said loops, excluding an array index of said subject array, to an array element in said subscript conversion array; and
a ninth step for outputting the parallelized program obtained by processing the input program along the second to eighth steps.

3. A method of parallelization of a program according to claim 2, wherein the fourth step further comprises the step of inserting a statement to calculate the number of elements in the mapping array whose values correspond to a processor number; and the sixth step further comprises the step of inserting a statement for establishing as values of elements of said subscript was array the subscripts of elements in said mapping array the values of which correspond to a process number.

4. A program parallelization apparatus comprising:
means for changing a declaration of a subject array to be divided by indirect division;
means for inserting a declaration of a subscript conversion array;
means for inserting a statement to calculate the size of said subject array after indirect division;
means for inserting statements to allocate areas for said subject array and said subscript conversion array;
means for inserting a statement to calculate the content of said subscript conversion array;
means for changing a control range of a loop; and
means for changing an array index that makes use of a control variable in said loop.

5. A program parallelization apparatus comprising:
first means for inputting a program to be parallelized;
second means for changing a declaration of a subject array in the input program, which subject array is to be subjected to indirect division by use of a mapping array;
third means for inserting a declaration of an allocated subscript conversion array for each mapping array in the input program;
fourth means for inserting a declaration to calculate during processing the size of said subject array after indirect division;
fifth means for inserting statements to allocate areas for said subject array and said subscript conversion array, in accordance with the size of the array obtained during processing by the statement inserted by the fourth step;
sixth means for inserting a statement to dynamically calculate the content of said subscript conversion array based on the content of the mapping array;
seventh means for changing the control ranges of every loop which is parallelizable and which includes a reference of said subject array and for changing an array index, excluding an array index of said subject array, to an array element in said subscript conversion array; and
eighth means for outputting a parallelized program obtained by processing according to said second to seventh steps.

6. A program parallelization apparatus according to claim 5, wherein, said fourth means inserts a statement to calculate the number of elements in the mapping array whose values correspond to a processor number, and the sixth means inserts a statement to establish as values of elements of said subscript array the subscripts of elements in said mapping array whose values correspond to a processor number.

7. A data processor readable recording medium storing a program configured to enable a computer execute a parallelization method comprising:
changing a declaration of a subject array to be subjected to indirect division;
inserting a declaration of a subscript conversion array;
inserting a statement to calculate the size of said subject array after indirect division;
inserting statements to allocate areas for said subject array and the subscript conversion array;
inserting a statement to calculate the content of the subscript conversion array;
changing a control range of a loop; and
changing an array index that makes use of a control variable in said loop.

8. A data processor readable recording medium storing a program configured to enable a computer to execute a parallelization method comprising:
a first step for inputting an input program to be parallelized;

a second step for changing a declaration of a subject array in said input program, which subject array is to be indirectly divided by use of a mapping array, into an allocation array declaration;

a third step for inserting a declaration of an allocation array for subscript conversion to each mapping array in said input program;

a fourth step for inserting a statement to calculate during processing the size of said subject array after division, before indirect division to each mapping array in the input program;

a fifth step for inserting a statement to allocate areas for said subject array and the subscript conversion array;

a sixth step for inserting a statement for dynamically calculating during processing the content of said subscript conversion array;

a seventh step for changing a control range of all loops which are parallelizable and contain a reference of said subject array;

an eighth step for changing an arrays index in the loop, excluding an array index of said subject array, to an array element in said subscript conversion array; and a ninth step for outputting a parallelized program obtained by processing said input program according to the second to eighth steps.

* * * * *

UNITED STATES PATENT AND TRADEMARK OFFICE
CERTIFICATE OF CORRECTION

PATENT NO.     : 6,460,176 B1
DATED          : October 1, 2002
INVENTOR(S)    : Kenji Suehiro and Hitoshi Murai It is certified that error appears in the above-identified patent and that said Letters Patent is hereby corrected as shown below:

Column 5,
Line 7, after "manner." insert -- Explanations of respective steps are described hereinafter. --.
Lines 16 and 17, delete "Explanations of respective steps are described hereinafter.".

Column 8,
Line 12, after "later." insert -- Subsequently, the control range of the loop is changed. As hereinabove described, the loop is divided corresponding to the number of elements of the array stored in each processor after division, and is parallelized. This process is to adjust the repeating number suitable for each processor. This process is carried out in step 106 in Fig. 1. The step 106 rewrites the control ranges of all loops which can be parallelized, and executes parallelization. Thereby, the sixth line in Fig. 3 is reformed into the ninth line in Fig. 5. --

Signed and Sealed this

Twenty-third Day of December, 2003

JAMES E. ROGAN
*Director of the United States Patent and Trademark Office*